US006351729B1

(12) United States Patent
Thomson

(10) Patent No.: US 6,351,729 B1
(45) Date of Patent: Feb. 26, 2002

(54) MULTIPLE-WINDOW METHOD FOR OBTAINING IMPROVED SPECTROGRAMS OF SIGNALS

(75) Inventor: David James Thomson, Murray Hill, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/352,417

(22) Filed: Jul. 12, 1999

(51) Int. Cl.[7] .......................... G10L 11/04; H04B 15/00

(52) U.S. Cl. ....................... 704/206; 704/205; 704/203; 704/226; 704/207; 381/94.3; 324/76.24

(58) Field of Search ................................ 704/226, 233, 704/203, 205, 206, 207, 220; 381/94.3; 73/861.25; 324/76.22, 76.24; 367/62; 702/76

(56) References Cited

U.S. PATENT DOCUMENTS

| | | | | | |
|---|---|---|---|---|---|
| 3,573,446 | A | * | 4/1971 | Bergland | 708/404 |
| 4,802,225 | A | * | 1/1989 | Patterson | 704/207 |
| 4,983,906 | A | * | 1/1991 | Hiller | 324/76.47 |
| 5,179,626 | A | * | 1/1993 | Thomson | 704/200 |
| 5,768,392 | A | * | 6/1998 | Graupe | 381/94.3 |
| 6,044,340 | A | * | 3/2000 | Van Hamme | 704/226 |
| 6,070,137 | A | * | 5/2000 | Bloebaum et al. | 704/227 |
| 6,122,610 | A | * | 9/2000 | Isabelle | 704/226 |
| 6,249,762 | B1 | * | 6/2001 | Kirsteins et al. | 704/233 |
| 6,263,306 | B1 | * | 6/2001 | Fee et al. | 704/203 |

OTHER PUBLICATIONS

D. J. Thomson, "Spectrum Estimation and Harmonic Analysis," *Proc. IEEE 70*, pp. 1055–1096 (1982).

D. Slepian, "Prolate Spheroidal Wave Functions, Fourier Analysis, and Uncertainty–V: The Discrete Case," *Bell System Tech. J. 57*, pp. 1371–1430 (1978).

D. J. Thomson, "Time Series Analysis of Holocene Climate Data," *Phil Trans. R. Soc. Lond. A 330* pp. 601–616 (1990).

W. Koenig et al., "The Sound Spectrograph," *J. Acoust. Soc. Am. 18*:19 (1946).

D. J. Thomson, "Multi–Window Bispectrum Estimates," *Proc. Workshop on Higher–Order Spectral Analysis,* pp. 19–23, (1989).

D. J. Thomson, "Multiple–Window Spectrum Estimates for Non–Stationary Data", *Proc. Workshop on Statistical Signal and Array,* pp. 344–347 (1998).

J. Fan et al. *Local Polynominal Modelling and its Applications* Chapman and Hall, London, 1996.

D. J. Thomson "An Overview of Multiple–Window and Quadratic–Inverse Spectrum Estimation Methods", *IEEE Proc. on Acoustics, Speech and Signal Processing,* pp. VI–185–VI–194, (1994).

L.J. Lanzerotti, et al. "Statistical Properties Of Shock–Accelerated Ions In The Outer Heliosphere" *The Astrophysical Journal,* 380, pp. L93–L96, (1991).

* cited by examiner

*Primary Examiner*—William Korzuch
*Assistant Examiner*—Vijay B Chawan
(74) *Attorney, Agent, or Firm*—Martin I. Finston

(57) ABSTRACT

There is disclosed a method for processing a time-varying signal to produce a high-resolution spectrogram that represents power as a function of both frequency and time. Data blocks of a time series, which represents of a sampled signal, are subjected to processing which results in a sequence of frequency-dependent functions referred to as eigencoefficients. Each eigencoefficient represents signal information projected onto a local frequency domain using a respective one of K Slepian sequences or Slepian functions. The spectrogram is derived from time- and frequency-dependent expansions formed from the eigencoefficients.

3 Claims, 2 Drawing Sheets

MULTIPLE-WINDOW METHOD FOR OBTAINING IMPROVED SPECTROGRAMS OF SIGNALS

FIELD OF THE INVENTION

The invention relates to methods for the spectral analysis of time-sampled signals. More particularly, the invention relates to methods for producing spectrograms of human speech or other time-varying signals.

ART BACKGROUND

It is useful, in many fields of technology, to determine the changing frequency content of time-dependent signals. For example, the spectral analysis of speech is useful both for automatic speech recognition and for speech coding. As a further example, the spectral analysis of marine sounds is useful for acoustically aided undersea navigation.

When an acoustic signal, or other signal of interest, is sampled at discrete intervals, a time series is produced. A time series is said to be stationary if its statistical properties are invariant under displacements of the series in time. Although few of the signals of interest are truly stationary, many change slowly enough that, for purposes of spectral analysis, they can be treated as locally stationary over a limited time interval.

The spectral analysis of stationary time series has been a subject of research for one hundred years. The earliest attempts to obtain a representation, or periodogram, of the power spectral density of the time series x(0), x(1), . . . , x(n), . . . , x(N−1) involved summing N terms of the form $x(n)\times e^{in\omega}$ and then taking the squared magnitude of the result. (The symbol ω represents frequency in radians per second. The symbol $f$, used below, represents frequency in cycles per second. Thus, $\omega=2\pi f$.) This operation was performed for each of N/2+1 discrete frequencies $f$. This was unsatisfactory for several reasons. One reason is that the result is not statistically consistent. That is, the variance of the resulting periodogram does not decrease as the sample size N is increased. A second reason is that the result can be severely biased by truncation effects, leading to inaccurate representation of processes having continuous spectra.

An improved spectrum estimate (it is an estimate because it is derived from a finite sample of the original signal) is obtained from the following method, which is conveniently described in two steps:

First, form the spectrum estimate $\tilde{S}_D(\omega)$ using a data window $D_0, D_1, \ldots, D_n, \ldots, D_{N-1}$ to taper the sampled data sequence, according to:

$$\tilde{S}_D(\omega)=\left|\sum_{n=0}^{N-1}x(n)D_ne^{-i\omega n}\right|^2. \tag{1}$$

The primary purpose of the data window is to control bias. That is, by tapering the sampled sequence, it is possible to mitigate the tendency of the frequency components where the power is highest to dominate the spectrum estimate.

Then, smooth the estimate $\tilde{S}_D(\omega)$ by convolving it with a spectral window G(ω) to form the smoothed spectrum estimate $\tilde{S}(\omega)$ according to $\tilde{S}(\omega)=\tilde{S}_D(\omega)*G(\omega)$, where * represents the convolution operation. The primary purpose of the spectral window is to make the spectrum estimate consistent. The spectral window is generally pulse-shaped in frequency space, and the width of this pulse is approximately the bandwidth of the spectrum estimate. Increasing the bandwidth decreases the variance of the resulting estimate, but it also reduces the frequency resolution of the estimate.

Although useful, the smoothed spectrum estimate $\tilde{S}(\omega)$ as described above has several drawbacks. The smoothing operation may obscure the presence of spectral lines. Moreover, the data window tends to give different weights to equally valid data points. The data window also tends to reduce statistical efficiency. That is, the amount of data needed to obtain a reliable estimate may exceed the theoretical ideal by a factor of two or more.

Recently, a new spectrum estimate having improved properties was proposed. This estimate is described, e.g., in D. J. Thomson, "Spectrum Estimation and Harmonic Analysis," *Proc. IEEE* 70 (September 1982) 1055–1096 (hereafter, "Thomson (1982)"). This estimate is computed using a sequence of window functions referred to as Slepian functions when expressed as functions of frequency, and as Slepian sequences when expressed as sequences in the time domain. Slepian functions are related to Slepian sequences through the Fourier transform. Because multiple window functions are used, such an estimate is referred to as a multitaper spectrum estimate, or occasionally as a multiple-window spectrum estimate.

The properties of Slepian functions and Slepian sequences are described in Thomson (1982), cited above, and in D. Slepian, "Prolate Spheroidal Wave Functions, Fourier Analysis, and Uncertainty—V: The Discrete Case," *Bell System Tech. J.* 57 (1978) 1371–1430, hereafter referred to as Slepian (1978). Briefly, the Slepian sequences depend parametrically on the size N of the data sample and on the chosen bandwidth W. (From practical considerations, the bandwidth is generally chosen to lie between 1/N and 20/N, and at least as a starting value it is typically about 5/N.) It should be noted that throughout this discussion, the well-known convention is used wherein all frequencies are normalized such that the Nyquist frequency equals 0.5.

Given values for these parameters, each Slepian sequence $\underline{v}^{(k)}(N,W)$ is a k'th solution to a matrix eigenvalue equation $\underline{\underline{M}}\underline{v}=\lambda_k\underline{v}$, where the element in the n'th row and m'th column of the matrix is given by:

$$\frac{\sin 2\pi W(n-m)}{\pi(n-m)},$$

n=1, 2, . . . , N, m=1, 2, . . . , N.

If the eigenvalues $\lambda_k$ of this equation are arranged in descending order, approximately the first K of them are very close to (but less than) unity. K is the greatest integer less than or equal to 2NW. At least for moderate values of N, the solutions are readily computed using standard techniques. (For such purpose, it is advantageous to use an alternative representation of these sequences which uses a matrix in tridiagonal form. For further information, see Slepian (1978), which is hereby incorporated by reference.)

The Slepian functions $U_k(N,W;f)$ are computed from corresponding Slepian sequences through the formula $$U_k(N,W;f)=\varepsilon_k\sum_{n=0}^{N-1}v_n^{(k)}(N,W)e^{i2\pi f\left[n-\frac{N-1}{2}\right]}, \tag{2}$$

where ϵ is 1 when k is even, and i when k is odd.

Of any function which is the Fourier transform of an index limited sequence, the k=0 Slepian function has the greatest fractional energy concentration within the frequency range between −W and W. More generally, the k'th eigenvalue $\lambda_k$ expresses the fraction of energy retained within this frequency range by the corresponding Slepian function. As noted, this fraction is very close to unity for the first K Slepian functions.

The spectrum estimate of Thomson (1982) is computed from K eigencoefficients $y_0(f)$, $Y_1(f)$, . . . , $y_{K-1}(f)$, wherein the k'th such eigencoefficient is computed through the formula, $$y_k(f) = \sum_{n=0}^{N-1} x(n) \frac{v_n^{(k)}(N, W)}{\varepsilon_k} e^{-i2\pi f\left(n-\frac{N-1}{2}\right)}. \tag{3}$$

At a given frequency $f=f_0$, the spectrum estimate, denoted $\overline{S}(f)$, is band limited to a frequency range of ±W about $f_0$. The spectrum estimate is computed from the eigencoefficients according to, $$\overline{S}(f) = \frac{1}{2NW} \sum_{k=0}^{K-1} \frac{1}{\lambda_k(N, W)} |y_k(f)|^2. \tag{4}$$

It will be appreciated that each term in this summation is individually a spectrum estimate of the usual kind, as represented, e.g., by Equation (1), in which a respective Slepian sequence is the data window. In fact, the k=0 term is the optimal spectrum estimate of that kind, but even so, it must be smoothed in order to make it statistically consistent. Smoothing, however, tends to increase the effective bandwidth to several times W, and it concomitantly increases the bias of the estimate. On the other hand, when the rest of the eigencoefficients are included (up to the k=K−1 term), consistency and good variance efficiency are achieved without decreasing the spectral resolution.

Multiple window spectrum estimates are discussed further in D. J. Thomson, "Time Series Analysis of Holocene Climate Data," *Phil. Trans. R. Soc. Lond. A* 330 (1990) 601–616 (hereafter, "Thomson (1990)"). That article introduces a slightly different definition of the Slepian function, which uses a more common definition of the Fourier transform than the one used, e.g., in Slepian (1978). The Slepian function $V_k(f)$ of Thomson (1990) may be computed by Fourier transforming the corresponding Slepian sequence according to:

$$V_k(N, W; f) = \sum_{n=0}^{N-1} v_n^{(k)}(N, W) e^{-i2\pi fn}. \tag{5}$$

This form of the Slepian function is related to $U_k(N,W;f)$ by the expression:

$$V_k(N, W; f) = \left(\frac{1}{\varepsilon_k}\right) e^{-i\pi f(N-1)} U_k(N, W; -f). \tag{6}$$

The same article also introduces an alternate form $x_k(f)$ for the eigencoefficients, given by $$x_k(f) = \sum_{n=0}^{N-1} e^{-i2\pi fn} v_n^{(k)}(N, W) \cdot x(n). \tag{7}$$

The same article also describes a multiple-window spectrum estimate $\overline{S}(f)$ computed by summing the squared magnitudes of the eigencoefficients $x_k(f)$, each weighted by an appropriately chosen weight coefficient $w_k$:

$$\overline{S}(f) = \frac{1}{K} \sum_{k=0}^{K-1} w_k |x_k(f)|^2. \tag{8}$$

Thomson (1990) also describes a procedure for subdividing the data sequence into overlapping blocks, the base time of each block advanced by some offset from the base time of the preceding block, and computing the multiple-window spectrum estimate on each block.

It should be noted that each of the preceding spectrum estimates implicitly assumes stationarity. That is, each assumes that $\overline{S}(f)$ does not involve time, except for the implicit time dependence that comes from defining the sample on the discretized time block spanning the interval (0, N−1). On the other hand, spectrograms dealing explicitly with nonstationary processes have been used for many years. An early paper describing such techniques is W. Koenig et al., "The Sound Spectrograph," *J. Acoust. Soc. Am.* 18:19 (1946). In essence, these techniques involve estimates of the kind expressed by Equation (1), above, with the further property that the sample is stepped along in time. Thus, such an estimate might be wiritten as $$\tilde{S}_D(b, f) = \left| \sum_{n=0}^{N-1} x(b+n) D_n e^{-i2\pi ft} \right|^2, \tag{9}$$

where b now represents the base time, that is, the time (measured from a fixed origin) at the beginning of a given sample block, and n represents relative (discrete) time within the block. Thomson (1990) updated this idea by replacing $\tilde{S}_D(f)$ with $\overline{S}(f)$ as in Equation (8), above.

SUMMARY OF THE INVENTION

Significantly, the bandwidth-limited signal in the frequency band $(f-W, f+W)$ can be expanded in the time block [0, N−1] as $$X(t, f) = \sum_{k=0}^{K-1} x_k(f) v_t^{(k)}(N, W), \tag{10}$$

where $x_k(f)$ is defined as in Equation (7), above. This observation is made, e.g., in D. J. Thomson, "Multi-Window Bispectrum Estimates," *Proc. Workshop on Higher-Order Spectral Analysis*, Vail, Colo. (Jun. 28–30, 1989). However, it has not been appreciated, until now, that such an expansion may be useful for formulating an improved spectrum estimate.

I have found an improved spectrum estimate that is based on the expansion described by Equation (10), above. Because this spectrum estimate depends explicitly on both time and frequency, I refer to it as a spectrogram. The time resolution of this spectrogram is approximately ½W. Because in typical applications the product 2NW is equal to the number K of Slepian sequences, an alternately formulated estimate for this bandwidth is N/K. By contrast, the time resolution of conventional spectrograms is typically roughly equal to the block size, N. Thus, my improved spectrogram is a high-resolution spectrogram.

In a broad aspect, my invention involves a method for processing a time-varying signal to produce a spectrogram. The method includes sampling the signal at intervals, thereby to produce a time series x(n), wherein x represents sampled signal values and n represents discretized time. The method further includes obtaining plural blocks of data $x_0$, $x_1$, . . . , $x_{N-1}$ from the time series, wherein each block contains signal values x(n) taken at an integer number N of successive sampling intervals.

The method further includes calculating an integer number K of eigencoefficients $x_k(f)$ on each said block, wherein each said eigencoefficient is dependent on frequency $f$ and has a respective index k, k=0, 1, . . . , K−1. The method further includes, for each said block, forming a time- and frequency-dependent expansion X(t,$f$) from the eigencoefficients, wherein t represents time.

The method further includes taking a squared magnitude of the expansion, and outputting a spectrogram derived at least in part from the resulting squared magnitude. Significantly, each eigencoefficient represents signal information projected onto a local frequency domain using a respective one of K Slepian sequences or Slepian functions. Moreover, each expansion X(t,$f$) is a sum of terms, each term containing the product of an eigencoefficient and a corresponding Slepian sequence.

DETAILED DESCRIPTION

In one simple form, the improved spectrogram is an expression F(t,$f$) for power as a function of time and frequency, related to X(t,$f$) by $$F(t,f)=\frac{1}{K}|X(t,f)|^2=\frac{1}{K}\left|\sum_{k=0}^{K-1}x_k(f)v_t^{(k)}(N,W)\right|^2. \qquad (11)$$

Figure 1:
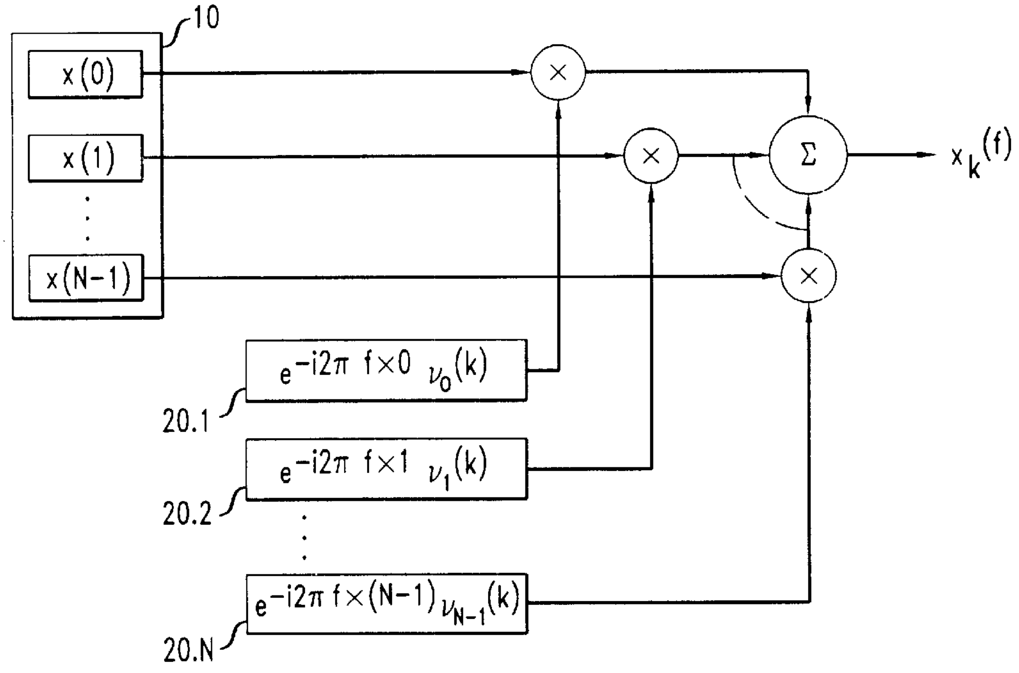
FIG. 1 is a schematic diagram illustrating a procedure or apparatus for computing an eigencoefficient from a block of sampled data, using Slepian sequences, in accordance with Equation (7).

FIG. 1 shows a procedure, in accordance with Equation (7), for obtaining eigencoefficients $x_k(f)$. Data block 10 is a sequence of N signal values, sampled at discrete times and digitized. The signal values are provided by any appropriate devices for sensing and conditioning of signals, such as microphones and associated electronic circuitry. Each of blocks 20.1–20.N represents a weighted complex sinusoid in frequency space. For each value of the index k, each of the weights in blocks 20.1–20.N is one scalar term from the k'th Slepian sequence. As shown, each sampled signal value is multiplied by a corresponding weighted sinusoid, and the results are summed. Through the frequency dependence of the complex sinusoids, each of the resulting eigencoefficients is a complex-valued function of frequency.

It should be noted that the raw eigencoefficients as given by Equation (7) tend to exhibit exterior bias. That is, the Slepian sequences are not strictly band-limited; instead, each has a certain energy fraction that lies outside of the bandwidth W. Uncorrected, this out-of-band energy fraction contributes bias, which can be particularly severe for the higher-order eigencoefficients, that is, for those whose index k is close to K. Accordingly, one way to suppress exterior bias is to limit k to values no greater than, e.g., K−2 or K−4.

Another way to suppress bias is to use the adaptive weighting procedure described in Thomson (1982). According to that process, a weight coefficient is obtained for each eigencoefficient $x_k(f)$. Each of these weight coefficients is a function of frequency. In Equation (11), each eigencoefficient is modified by multiplying it by its respective weight coefficient. The adaptive weighting procedure, which is described at pages 1065–1066 of Thomson (1982), obtains optimized weight coefficients by minimizing an error function which measures bias in pertinent spectral estimates.

Yet another, and currently preferred, method for suppressing bias is a procedure that I refer to as coherent sidelobe subtraction. This procedure also obtains weight coefficients for the eigencoefficients.

Let X($f$) be the finite Fourier transform of the data. Then, very briefly, the coherent sidelobe subtraction procedure begins with the following estimate of dX($f$⊕ξ), where the special symbol ⊕ indicates that the absolute value of ξ must be less than W:

$$d\hat{X}^{(1)}(f\oplus\xi)\approx\sum_{k=0}^{K-1}\hat{x}_k^{(1)}(f)V_k(\xi)d\xi. \qquad (12)$$

Here, each $\hat{x}_k^{(1)}$ is an estimate of an eigencoefficient. Next, using weighted, overlapped estimates of dZ, a global estimate of dZ is formed, much in the manner of local regression smoothing. Then, using an exterior convolution, the coherent bias on the various $\hat{x}_k^{(1)}$ is estimated and subtracted. Further details are provided in Appendix I attached hereto.

Figure 2:
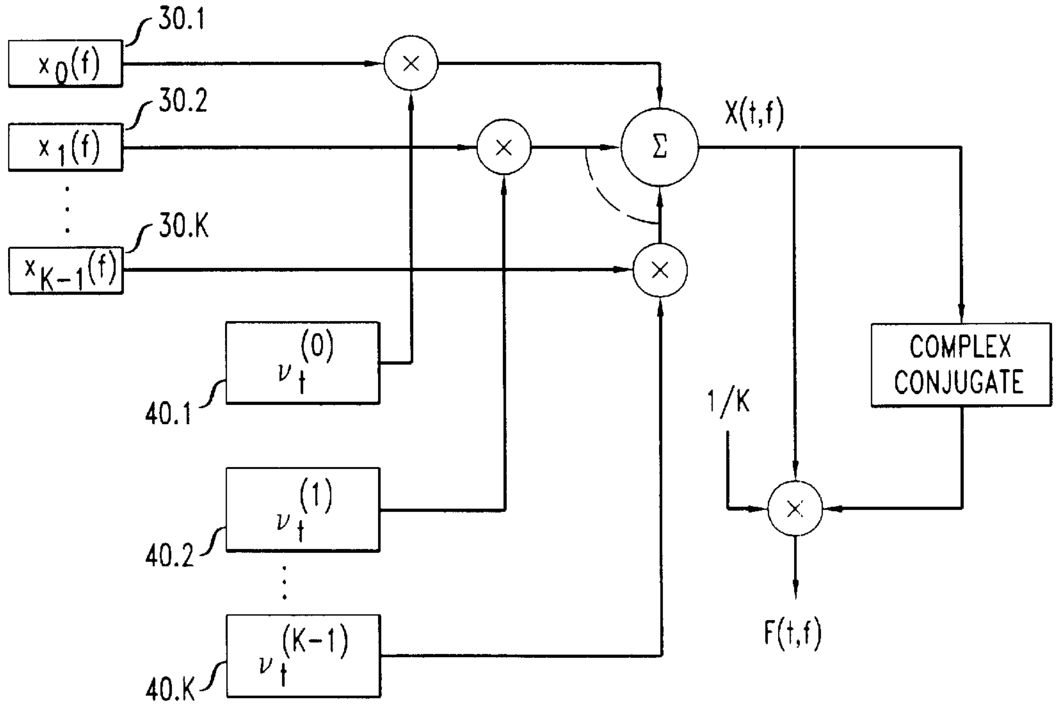
FIG. 2 is a schematic diagram illustrating a procedure or apparatus for computing a spectrogram in accordance with aspects of the present invention as represented by Equation (11).

FIG. 2 shows the assembly of the raw or weighted eigencoefficients into the spectrogram F(t,$f$). Each of eigencoefficients 30.1–30.K is multiplied by a corresponding Slepian sequence. This multiplication is carried out such that the k'th eigencoefficient is multiplied by the k'th Slepian sequence. Significantly, each eigencoefficient is a function of (continuous) frequency, and each Slepian sequence is a function of (discrete) time. Thus, each resulting product is a function of both frequency and time. The products are summed to form X(t,$f$) in accordance with Equation (10). The figure shows the formation of F(t,$f$) by multiplying X(t,$f$) by its complex conjugate and normalizing by 1/K. The signal processing of FIGS. 1 and 2 is readily carried out by a digital computer or digital signal processor acting under the control of an appropriate hardware, software, or firmware program.

In many cases, it will be most useful to apply the high-resolution spectrogram to data that are sampled in overlapping blocks. Such blocks are conveniently described in terms of the base time b, the relative time t within a frame (which may be thought of as an offset from the base time of the frame), and the absolute time $t_0$, which at a given position within a given frame is the sum of the corresponding base time and offset: $t_0$=b+t. In these terms, an expression for eigencoefficients $y_k(b,f)$ in which the base position is made explicit is given by:

$$y_k(b,f)=\sum_{n=0}^{N-1}e^{-i2\pi fn}v_n^{(k)}(N,W)\cdot x(b+n). \qquad (13)$$

A corresponding spectrogram F(b⊕t,$f$), in which the symbol ⊕ indicates that the offset t may be included in the sum only if it lies in the interval [0, N−1], is given by:

$$F(b\oplus t, f)=\frac{1}{K}\left|\sum_{k=0}^{K-1} y_k(b,f)v_t^{(k)}(N,W)\right|^2. \tag{14}$$

It should be noted in this regard that because the expansion of Equation (10), above, extrapolates the signal to times lying beyond the interval [0, N−1], the above restriction on the sum in the time argument is merely advisable, but not strictly necessary.

At the edges of blocks, it is possible for the spectrogram to exhibit error related to the well-known Gibbs phenomenon. This is advantageously mitigated through an averaging procedure. For example, the spectrogram is readily averaged over two or more overlapping blocks. Where the blocks overlap, the constituent values that contribute to the average at each point in time are taken at positions in their respective blocks for which the corresponding base time and offset have a common sum; i.e., for computing an average at $t_0$, the constituent values are taken at respective positions for which $b+t=t_0$.

Those skilled in the art will appreciate that such an average over overlapping blocks is advantageously made a weighted average. Exemplary weighting procedures are described in the attached Appendix II.

Significantly, the spectrogram of Eq. (14) can be extended to include many overlapping data sections, so high-resolution spectrograms of long data sets can be formed by averaging.

Figure 3:
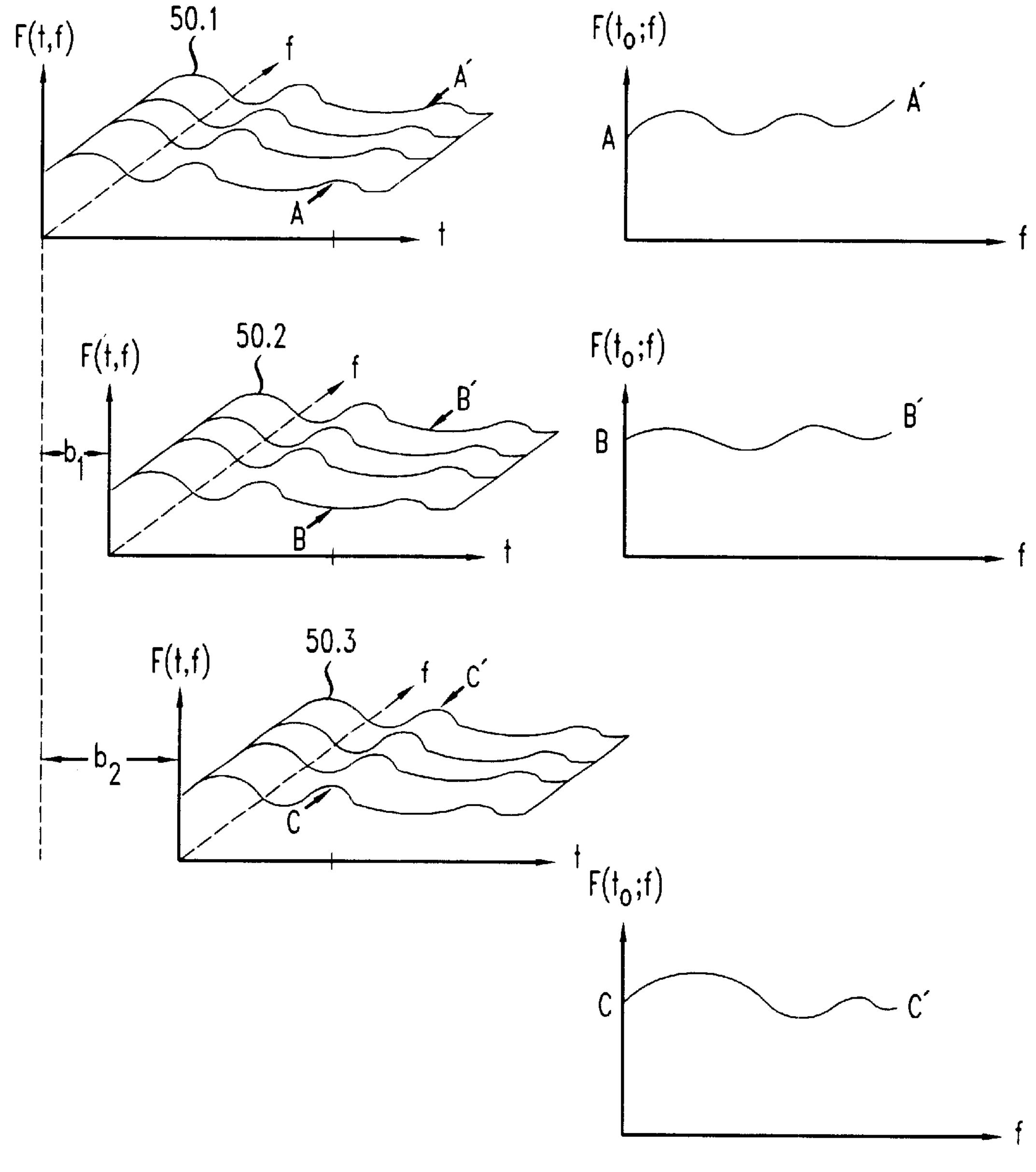
FIG. 3 is a schematic representation of a process of obtaining spectral data from overlapping blocks of sampled data for the purpose of averaging, according to the invention in one embodiment.

FIG. 3 illustrates an averaging process for overlapping data blocks. Each of sheets 50.1–50.3 represents a spectrogram obtained from a respective data block. The first of these blocks has a base time of 0, the second a base time of $b_1>0$, and the third a base time of $b_2>b_1$. Sections A–A', B–B', and C–C' represent frequency spectra taken from sheets 50.1, 50.2, and 50.3, respectively, at values of the time, measured within the respective blocks, that all correspond to the same absolute time $t_0$. These spectra are readily averaged, as discussed above, to provide an average spectrum for each given value of the absolute time.

Appendix I: Coherent Sidelobe Subtraction

Begin with Equation (12). Note that for any frequency $f_0$ there is a range of frequencies ($f_0$−W, $f_0$+W) giving an estimate of $d\hat{X}^{(1)}(f_0)$, specifically $$d\hat{X}^{(p)}(f_0:\xi)\approx\sum_{k=0}^{K-1}\hat{x}_k^{(p)}(f_0-\xi)V_k(\xi)d\xi \tag{15}$$

nominally independent of the free parameter ξ. Here $\hat{x}_k^{(p)}(f)$ is the estimate of $x_k(f)$ at the $p^{th}$ interation.

We use a weighted sum of the free-parameter expansions to form an estimate of dX $$d\hat{X}^{(p)}(f)=\frac{1}{2W}\int_{-W}^{W}Q(\xi)d\hat{X}^{(p)}(f_0:\xi)df \tag{16}$$

where the weighting function Q may reflect nothing more than that the convergence of the orthogonal expansions is generally poorer near the ends of the domain than in the center or, in regions where the spectrum is changing rapidly, that some expansions are less reliable than others.

Next, estimate the exterior bias of $x_k(f)$ using the convolution over the exterior domain $$\hat{b}_k^{(p+1)}(f)=\int_{-1/2}^{1/2}V_k(\xi)d\hat{X}^{(p)}(f-\xi)-\int_{-W}^{W}V_k(\xi)d\hat{X}^{(p)}(f-\xi) \tag{17}$$

and subtract it from the raw eigencoefficients to form an improved estimate $$\hat{x}_k^{(p+1)}(f)=y_k(f)-\hat{b}_k^{(p+1)}(f). \tag{18}$$

The integral in Equation (17) is taken between the limits −1/2 to 1/2, but excluding the range −W to W.

Appendix II: Weighting Procedures for Averages Over Overlapping Blocks

One possible approach is to use a scaled version of the Epanechnikov kernel, which is known to be optimum in certain pertinent problems. The Epanechnikov kernel is described, e.g., in J. Fan and I. Gijbels, *Local Polynomial Modelling and its Applications*, Chapman and Hall, London, 1996. Very briefly, the Epanechnikov kernel $K_0(t)$ is given by:

$$K_0(t)=\frac{3}{4}\left[1-\left(\frac{2t}{N-1}-1\right)^2\right].$$

Thus, one appropriate weighted average $\overline{F}_E(t_0,f)$ is given by:

$$\overline{F}_E(t_0,f)=\sum_{t=0}^{N-1}K_0(t)F(t_0-t\oplus t, f).$$

A second possibility is to weight by Fisher information as well. An estimate $\hat{I}(b,f)$ of Fisher information is given by:

$$\hat{I}(b,f)=\left[\frac{1}{K}\sum_{k=0}^{K-1}|y_k(b,f)|^2\right]^{-2}.$$

Using this estimate, an adaptively weighted average $\overline{F}_A(t_0,f)$ can be taken according to:

$$\overline{F}_A(t_0,f)=\frac{\sum_{t=0}^{N-1}K_0(t)I(t_0-t,f)F(t_0-t\oplus t,f)}{\sum_{t=0}^{N-1}I(t_0-t,f)}.$$

Here, as well as in $\overline{F}_E(t_0,f)$, above, the summation represented by $$\sum_{t=0}^{N-1}$$

can be replaced by a sum at the Nyquist rate $$\Delta T=\frac{1}{2W}.$$

This would give, for example:

$$\sum_{t=\frac{\Delta}{2},\frac{3\Delta}{2}}^{(K-\frac{1}{2})\Delta} \frac{K_0(t)I(t_0-t,\ f)F(t_0-t\oplus t,\ f)}{\sum_{t=\frac{\Delta}{2},\frac{3\Delta}{2}}^{(K-\frac{1}{2})\Delta} K_0(t)I_0(t_0-t,\ f)}.$$

The invention claimed is:

1. A method for processing a time-varying signal to produce a spectrogram, comprising:

a) sampling the signal at intervals, thereby to produce a time series x(t), wherein x represents sampled signal values and t represents discretized time;

b) obtaining plural blocks of data $x_0, x_1, \ldots, x_{N-1}$ from the time series, wherein each block contains signal values x(t) taken at an integer number N of successive sampling intervals;

c) calculating an integer number K of eigencoefficients $x_k(f)$ on each said block, wherein each said eigencoefficient is dependent on frequency $f$ and has a respective index k, k=0, 1, . . . , K−1;

d) for each said block, forming a time- and frequency-dependent expansion X(t,f) from the eigencoefficients;

e) taking a squared magnitude of the expansion; and f) outputting a spectrogram derived at least in part from the result of step (e), wherein:

I) each eigencoefficient represents signal information projected onto a local frequency domain using a respective one of K Slepian sequences or Slepian functions; and II) each expansion X(t,$f$) is a sum of terms, each term containing the product of an eigencoefficient and a corresponding Slepian sequence.

2. The method of claim 1, wherein the signal information projected in each eigencoefficient is sampled at offsets 0, 1, . . . , N−1 from a base position b within the time series.

3. The method of claim 2, wherein:

each block overlaps at least one other block in an overlap region;

in each overlap region, the spectrogram is averaged over overlapping blocks; and said averaging is carried out over respective combinations of base position and offset that have a common sum.

* * * * *